Jan. 15, 1957     J. P. ARENA     2,777,614
MEASURING AND DISPENSING DEVICE FOR LIQUOR
Filed June 11, 1952     3 Sheets-Sheet 1
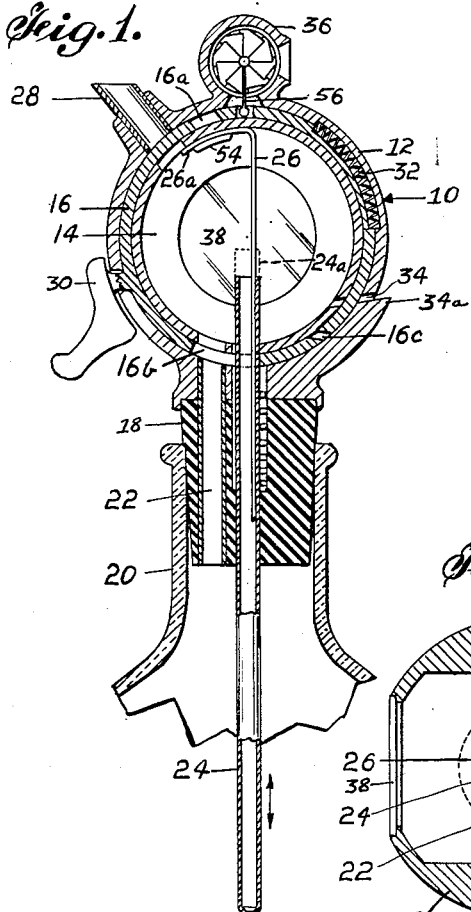
INVENTOR
JOSEPH P. ARENA
BY
ATTORNEY Jan. 15, 1957 J. P. ARENA 2,777,614
MEASURING AND DISPENSING DEVICE FOR LIQUOR
Filed June 11, 1952 3 Sheets-Sheet 2
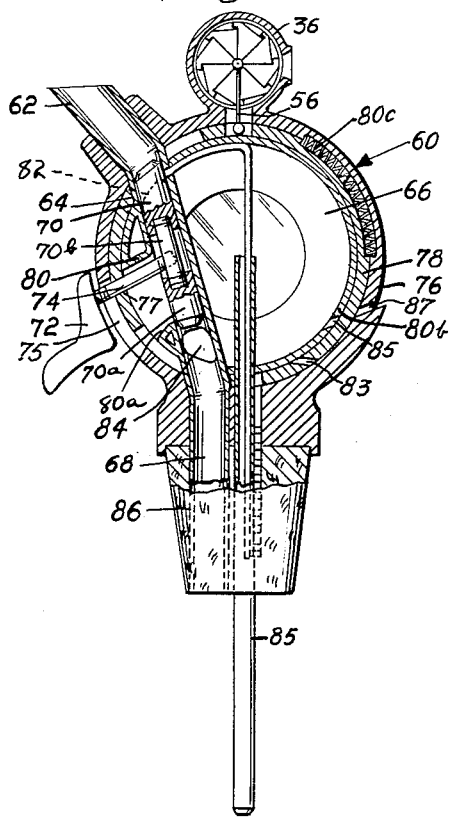
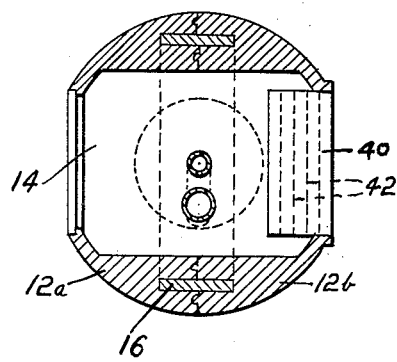
INVENTOR
JOSEPH P. ARENA
BY
ATTORNEY Jan. 15, 1957  J. P. ARENA  2,777,614
MEASURING AND DISPENSING DEVICE FOR LIQUOR
Filed June 11, 1952  3 Sheets-Sheet 3
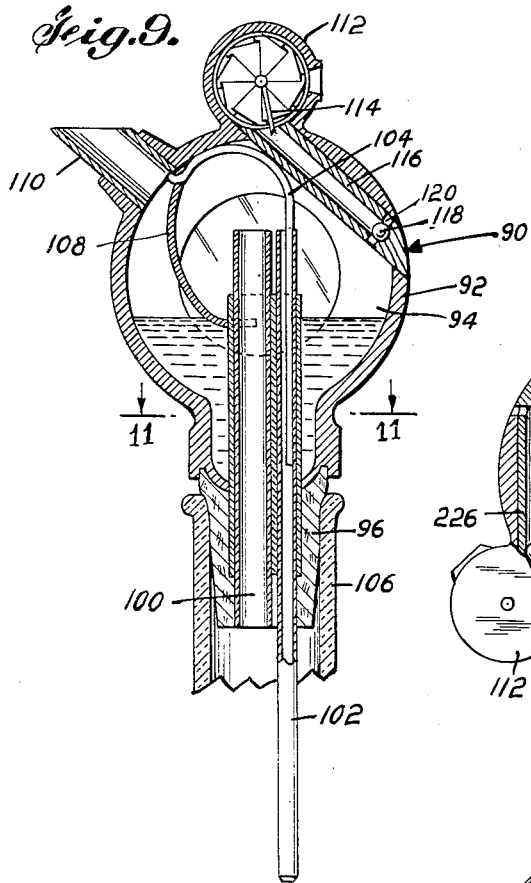
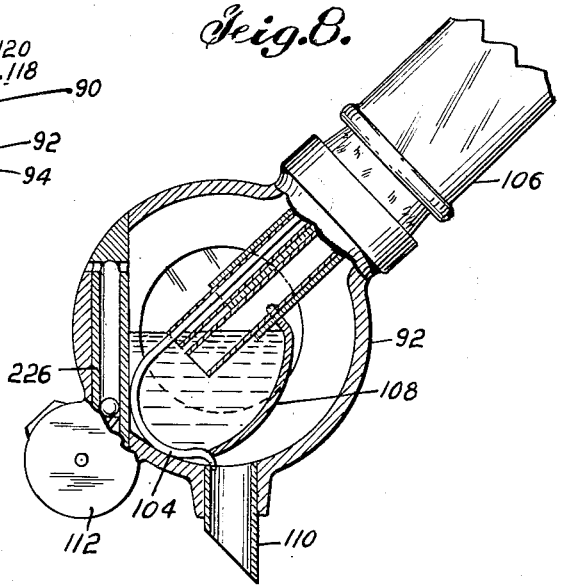
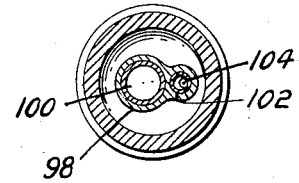
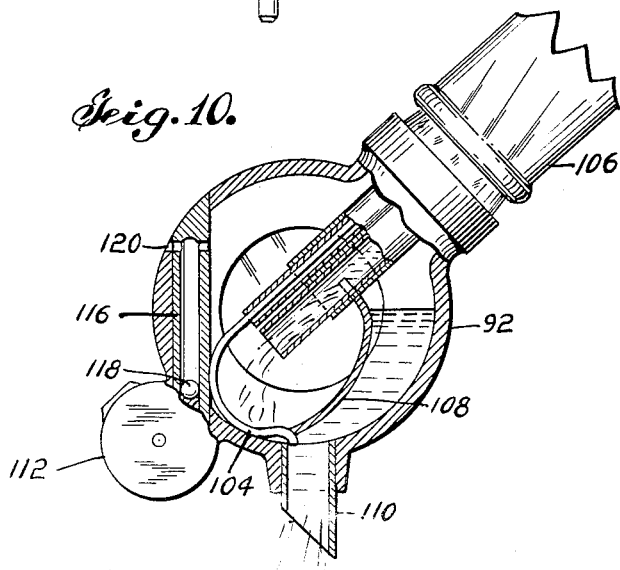
INVENTOR.
JOSEPH P. ARENA
BY
*Samuel J. Stoll*
ATTORNEY

# United States Patent Office 2,777,614
Patented Jan. 15, 1957

2,777,614

MEASURING AND DISPENSING DEVICE FOR LIQUOR

Joseph P. Arena, Astoria, N. Y.

Application June 11, 1952, Serial No. 292,938

1 Claim. (Cl. 222—442)

This invention relates to a device for measuring and dispensing liquor from a bottle.

Measuring and dispensing devices for liquor have been known to the art and to the industry for many years and a great deal of development work has gone into the design and manufacture of such devices. Many of them have been patented. But none to applicant's knowledge has ever attained any genuine measure of success under conditions of actual use. Some of these devices of the prior art have been inaccurate in their measuring aspects and it is obvious that such inaccuracy would defeat the very purposes for which the devices are made and used. Others of these devices have been to costly to produce and they have been well beyond the financial means of those who would normally be expected to buy and use them. Still others have been impractical in the sense that their liquor measuring means have been rigidly fixed so as to prevent said devices from being adjusted to deliver or dispense different quantities of liquor. In some cases, adjusting means have been provided but they have not performed accurately or satisfactorily.

It is accordingly the principal object of this invention to provide a measuring and dispensing device of the character described which is a. Accurate in its ability to measure out and dispense a predetermined quantity of liquor, b. Readily and accurately adjustable so as to provide for measuring and dispensing different quantities of liquor, c. Adapted to count and record the number of times it dispenses a measured quantity of liquor, d. Completely effective to the very last full measurement of liquor contained in the bottle on which the device is mounted, e. Portable in the sense that when it is attached to a bottle it is movable with the bottle and the bottle may be handled in conventional manner to dispense its contents, f. Handy and convenient to serve liquor in a professional manner, without spillage, waste or the like, g. Readily adapted to be sealed to a liquor bottle to prevent dilution of the liquor or any tamperaing whatsoever therewith, h. Permanently attached to the liquor bottle, at least as long as the bottle contains liquor, so as to serve as a closure or seal relative to said bottle and to prevent contamination of its contents, i. Simple and fool-proof in operation so that the manner of its use may be taught without any trouble whatsoever to bartenders of every calibre and educational background, j. Simple in construction so that it may be made to sell at a relatively low price well within the means of those who would be expected to buy and use the same, bearing in mind that each bar would require a plurality of such devices, one for each popular bottle of liquor, k. Clean and sanitary in every respect, since there are no moving parts within the liquor chamber, all moving parts being enclosed within the walls of the housing, l. Tamper-proof in the sense that all of its moving and adjustable parts are sealed within the housing so as to prevent unauthorized changes or adjustments, m. Provided with a mechanism for counting and recording the number of drinks dispensed, said mechanism functioning when the bottle is handled in the usual way to dispense a drink and being situated in such location as to avoid any contact.

This invention is intended primarily to be applied to the dispensing of liquor in bars, restaurants and other similar establishments. It may be applied however to other fields, such as the pharmaceutical and medicinal fields. A device of the character herein described and claimed my be used to measure out and dispense medicinal preparations and the like.

Preferred forms of this invention are shown in the accompanying drawing in which:

Fig. 1 is a longitudinal section through a liquor measuring and dispensing device made in accordance with one form of this invention, said device being shown mounted in the neck of a conventional liquor bottle.

Fig. 2 is a side view of said measuring and dispensing device, showing it removed from said liquor bottle.

Fig. 3 is a view similar to that of Fig. 1, but showing the measuring and dispensing device tilted for dispensing purposes and showing its spout valve open to allow the liquor to flow therethrough.

Fig. 4 is a transverse section through said measuring and dispensing device, showing how its housing is held together and how its ring-shaped valve member is held in place in said housing.

Fig. 5 is an enlarged fragmentary view showing the adjustment feature of said measuring and dispensing device, whereby it may be made to measure out and dispense different quantities of liquor.

Fig. 6 is a view in longitudinal section of a measuring and dispensing device made in accordance with a second form of this invention.

Fig. 7 is a transverse section therethrough.

Fig. 8 is a fragmentary section through a measuring and dispensing device made in accordance with a third form of this invention, showing said device in tilted position to fill its liquor chamber.

Fig. 9 is a section through the same device shown in Fig. 8, showing it however in untilted position, said position representing the second step in the process of measuring and dispensing the liquor.

Fig. 10 is a view similar to that of Fig. 8 showing the liquor which entered the liquor chamber in Fig. 8 being dispensed through the pouring spout and also showing additional liquor entering the liquor chamber.

Fig. 11 is a transverse section on the line 11—11 of Fig. 9.

Referring now to the first form of this invention as shown in the drawing and more particularly to Figs. 1 to 5 inclusive, it will be seen that measuring and dispensing device 10 includes a housing 12 having a liquor chamber 14 formed therein, a ring-shaped valve member 16 rotatably mounted in said housing, a rubber covered neck portion 18 which supports the housing and which is insertable into the neck of a liquor bottle 20, an inlet tube 22 in said neck portion 18 through which the liquor contents of the bottle may enter the liquor chamber 14, a second tube 24 in said neck portion 18 through which the air which occupies liquor chamber 14 may flow from said chamber and into the bottle as it is replaced by the liquor which enters said chamber from said bottle, a third tube 26 mounted in said second tube 24, a dispensing spout 28 which is formed in said housing and which communicates with the liquor chamber therein, a finger piece or trigger 30 which is connected to the ring-shaped valve member to move the same into closing relation to the inlet tube 22 and in opening relation to the dispensing spout 28, a compression spring 32 in said housing which also engages the ring-shaped valve member and which tends to move it into open relation to inlet tube 22 and closed relation to dispensing spout 28, an air vent 34 in said housing which said ring-shaped valve member also controls, and a counting and recording mechanism 36 which is mounted on said housing for engagement with said ring-shaped valve member so that the movement of said valve member will actuate said counting and recording mechanism.

The details of construction of housing 12 are shown in Fig. 4 where it will be noted that the housing consists of two shells 12a and 12b respectively which are in tongue-and-groove engagement with each other. Each shell is provided with an annular channel 12c and the two channels of both shells are in registration with each other to form an annular space which accommodates the ring-shaped valve member 16. Said valve member fits snugly in said annular space so as to prevent leakage of the liquor contents of the chamber in said housing but the valve member is free nonetheless to engage in angular movement therethrough in response to the action thereon of trigger 30 on the one hand and spring 32 on the other hand. It will be seen in Fig. 1 that the valve member has a hole 16a formed therein which is registrable with pouring spout 28 when the ring-shaped valve member is in its Fig. 3 position and it will also be seen that a second hole 16b is formed in said valve member, said hole being registrable with tube 22 when said valve member is in its Fig. 1 position. Similarly, a third opening 16c is formed in the ring-shaped valve member for registration with air vent 34 when said valve member is in its Fig. 3 position.

Again referring to Fig. 4, it will be seen that windows 38 and 39 respectively are provided in shells 12a and 12b of the housing. It is through these windows that the inside of said housing and its liquor contents may be seen. These windows may be securely fixed in the housing shells in any conventional manner and by any conventional means to prevent leakage. Turning now to Fig. 7 it will be seen that a relatively thick window 40 has been substituted for relatively thin window 39. It will also be noted that a plurality of parallel dotted lines 42 are indicated in said thick window 40. It will be understood that the thicker the window, the smaller will the liquor chamber 14 be and the thinner the window the larger will said liquor chamber be. The dotted lines are intended to indicate various thicknesses of windows which may be incorporated into shell 12b. Since these windows project inwardly into the liquor chamber of the housing, they control the size of said liquor chamber, as has just been indicated, and by the same token, since the window does not project outwardly, there is no outward manifestation of the inner characteristics of said window and no interference with the normal handling of the device. A window of any desired thickness may be incorporated into the same housing and without changing the constructional features of the housing or its shape or size, the size of the liquor chamber formed therein will be varied accordingly. The window may be made interchangeable in the same housing so as to provide for dispensing drinks of various sizes, depending upon individual preferences and requirements.

The adjustment feature last above described may or may not be used in combination with the mechanism shown in the first five figures of the drawing. If it is applied to said mechanism, then there is no need for rendering the breather tube 24 adjustable therein, except possibly between two positions, although even this is not necessary. However, where windows 38 and 39 are employed in said mechanism, then it is necessary that breather tube 24 be adjustable therein so that the mechanism will measure out and dispense different quantities of liquor. Fig. 3 is illustrative of this proposition and it will there be seen that when the device herein claimed is tilted, together with the liquor bottle in which it is mounted, in order to dispense the liquor by first transferring some of the contents of the bottle to the liquor chamber of said device and then pouring the transferred liquor out of said liquor chamber, the position of breather tube 24 will determine the extent to which the liquor chamber will receive liquor from the bottle, and by the same token, the position of said breather tube will similarly determine the quantity of liquor which will be dispensed from said liquor chamber. When the liquor 44 in liquor chamber 14 reaches and closes the open end of said breather tube 24, further flow of liquor from the bottle into said liquor chamber will be prevented since there would be no way for the air in said chamber to flow into the bottle for replacement by the liquor.

Fig. 5 discloses the details of the adjustment feature of breather tube 24. Said tube 24 is slidably disposed in a sleeve 46 which is set into housing 12 and neck portion 18. There is a longitudinally extending slot 48 in said sleeve and a series of notches 50 along one side of said slot. A pin 52 is affixed to breather tube 24 and it will be noted that said pin is selectively engageable with said notches. It is by this means that said breather tube may be selectively positioned relative to the liquor chamber within the housing. Dotted lines 24a in Fig. 1 indicate an alternative position to the one represented by the solid lines in said Fig. 1. When the tube is in its solid line position in Fig. 1, the liquor chamber will receive a greater quantity of liquor than it would receive if the tube were in its dotted line position in said Fig. 1.

Tube 26 is a secondary breather tube which is fixed in position relative to the liquor chamber. Tube 26 has an end portion 26a which is bent over substantially at right angles to the main body of the tube and which is arcuate in shape to conform to the curvature of the inner wall of housing 12. A clip 54 secures said bent end portion 26a to said inner wall of the housing. It will be noted that the opposite end of tube 26 projects into tube 24 without blocking said tube 24 or interfering in any way with its adjustment.

The counting and recording device 36 has a downwardly extending arm 56 which engages ring-shaped valve member 16. As said valve member is caused to move by means of finger pressure on trigger 30, said arm 56 will be actuated and with it the counting and recording mechanism. No claim is made herein to any specific type of counting and recording mechanism and any conventional type will suffice for the purposes of this invention.

Arm 56 is illustrative of a connecting link between the counting and dispensing mechanisms and a gear wheel may be substituted for said arm, if desired.

This counting and recording device may be located in any desirable position on the housing or even in the housing, the sole requisites being that it be so positioned with respect to the moving parts of the dispensing mechanism that they would be engageable therewith so as to actuate it each time a drink is served and further that it be completely out of contact with the liquor itself to avoid contamination thereof. Shield 34a, which is situated immediately adjacent air vent 34 in the housing, juts outwardly from the housing in order to prevent the thumb or other finger of the person using the device herein claimed from closing off the vent, either during the liquor chamber filling operation or during the liquor dispensing operation. This would prevent both accidental and intentional sealing of the air vent with consequent inaccuracy of the drink measurement.

Still another important feature of the device above described is the fact that its breather tube 24 is centrally located with respect to the liquor chamber 14. Such being the case, accurate measurements of liquor invariably take place, irrespective of the position in which the entire device is held during the liquor chamber filling operation. Breather tube 24 will always occupy a central position within said liquor chamber, irrespective of the depth of penetration of said tube into said chamber.

Secondary breather tube 26 however need not necessarily be centrally disposed, since its function is different from that of the main breather tube 24. The secondary breather tube assures an uninterrupted flow of liquor into the liquor chamber, irrespective of how many drinks are consecutively dispensed with the bottle in its tilted position. In other words, the secondary breather tube will enable a bartender to tilt the bottle once and by working the trigger to dispense as many drinks as the bottle contains.

The measuring and dispensing device 60 shown in Fig. 6 is basically similar to that shown in Fig. 1 but its liquor dispensing mechanism is somewhat different. More specifically, dispensing spout 62 is connected at its inner end to a tube 64 which extends through the liquor chamber 66 and which, in turn, is connected to inlet tube 68. The inlet tube 68 corresponds in location and function to inlet tube 22 above mentioned. It will be noted that plungers 70 and 70a are slidably mounted in tube 64 for longitudinal movement therein. A rod 70b connects the two plungers and positions them relative to each other so as to provide for integral movement of said plungers. A trigger 72 is connected to said connecting rod 70b by means of an arm 74 which extends through suitable openings 75 and 77, respectively, in housing 76 and ring-shaped valve member 78. Walls 80 and 80a connect tube 64 with the inside wall 80b of the housing and they serve to close off the liquor chamber 66 from the openings through which arm 74 projects. In other words, the liquor in said chamber is prevented from contacting arm 74 and rod 70b.

Trigger 72 may be moved downwardly from the position which it is shown to occupy in Fig. 6 in order to move the two plungers downwardly. It will be understood that arm 74 is slidably movable through a hole in the ring-shaped valve member 78. This is necessary to allow for relative movement between said arm 74 and said ring-shaped valve member since the arm would move on a straight line whereas the valve member would move on a curved line. A spring 80c is recessed in the housing and in the ring-shaped valve member and its object is to maintain said ring-shaped valve member in the same position in which it is shown in Fig. 6. When the trigger is depressed, the ring-shaped valve member is caused to turn in counter-clockwise direction as viewed in Fig. 6, against the action of said spring. When the trigger is released, the spring will return said valve member and said trigger and the plungers connected thereto to their Fig. 6 positions.

It will be noted that openings 82 are formed at the upper end of tube 64 to provide communication between said tube and liquor chamber 66. These openings also provide communication between said liquor chamber and the pouring spout 62. At the opposite end of tube 64 are openings 84 which provide communication between said tube and the liquor chamber and also between tube 68 and the liquor chamber. Plungers 70 and 70a serve as valve members with respect to said openings 82 and 84 respectively. When the plungers are in their Fig. 6 positions, communication is provided between the liquor chamber and inlet tube 68 to enable the liquor to flow from the liquor bottle into said liquor chamber. Pouring spout 62 is closed off by plunger 70 from communication with said liquor chamber. The liquor bottle to which the entire device shown in Fig. 6 is connected may now be tilted so as to cause the liquor to flow into the liquor chamber. The flow will stop when the liquor in the liquor chamber rises to the point where it closes off breather tube 85 and thereby prevents air from leaving the liquor chamber and flowing into the bottle. The trigger may now be pulled to close off opening 84 and to open opening 82.

At the same time, vent opening 83 in ring 78 is thereby brought into registration with aligned vent openings 85 and 87, respectively in wall 80b and housing 76.

Communication between the liquor bottle and the liquor chamber through tube 68 is now interrupted but communication is opened between said liquor chamber and the pouring spout. Consequently, it is now possible to pour the contents of said liquor chamber into a suitable receptacle. The trigger may now be released and spring 80c will return the ring-shaped valve member and the plungers, as well as the trigger to their Fig. 6 positions.

The rest of the mechanism shown in Fig. 6 is basically similar to that shown in Fig. 1 and there is therefore no need to describe it. It may be said however that neck portion 86 is made of cork, rather than of rubber, to indicate that this is an alternative possibility. It should also be said that although two plungers 70 and 70a are shown in the drawing, connected by a rod, a single plunger would also be completely feasible, the sole requirement being that its end portions be spaced apart as far as the end portions of the two plungers 70 and 70a.

Referring now to Figs. 8, 9, 10 and 11, it will be seen that a liquor measuring and dispensing device 90 is provided which has no moving valve parts. It has a housing 92 with a liquor chamber 94 formed therein. The lower end of the housing is connected to a neck portion 96 with a tubular member 98 projecting therethrough. A pouring tube 100 extends through said tubular member 98 and a breather tube 102 also projects therethrough. A secondary or auxiliary breather tube 104 projects in part through breather tube 102. The neck portion 96 of said device projects into the neck 106 of a liquor bottle and supports said device thereon. A curved baffle plate 108 is formed in liquor chamber 94 and it will be noted in Fig. 8 that when the bottle is tilted, liquor pours out of the bottle through tube 100 into the space defined by said baffle plate and the wall of the housing.

When the bottle is then returned to its normal vertical position, the liquor which was trapped by the baffle plate now flows into the lower portion of the liquor chamber, below said baffle plate. When the bottle is once again tilted, as shown in Fig. 10, this entrapped liquor will flow out of the liquor chamber through a spout 110 which communicates with the upper end of said liquor chamber on the outside of said baffle plate. At the same time, additional liquor will flow out of the bottle and into the space defined by the baffle plate. This process is repeated as many times as there is liquor in the bottle.

The size of the space defined by the baffle plate and the position of the breather tube will determine the quantity of liquor which will flow out of the bottle each time it is tilted to its Fig. 8 position. The position of the breather tube may be adjusted to varied locations, as have above been described with respect to the first form of this invention, in order to vary the quantity of liquor which will flow at any given time out of the bottle and into the space defined by the baffle plate.

A counting and recording device 112 is provided on housing 92 and it will be understood that said device is conventional and is similar to the devices above shown in Figs. 1 and 6. It has a downwardly extending arm 114 which projects into a tube 116 in the housing. A ball 118 is movable in said tube from one end to the other. When the bottle is in its upright position, as shown in Fig. 9, the ball is situated at the lower end of tube 116 and it will be seen that it closes off an air vent 120 which provides communication between the liquor chamber within the housing and the atmosphere. When the bottle is tilted to its Fig. 8 position, the ball drops to the opposite end of tube 116 where it strikes arm 114 and causes it to move sufficiently to actuate the counting and recording mechanism.

The foregoing is illustrative of three preferred forms of this invention. Other forms and modifications of these forms may be had within the broad spirit of the invention and the broad scope of the claim.

For example, the liquor measuring and dispensing device 90 is so arranged that it may be actuated by tilting the bottle on an axis which extends transversely of its longitudinal axis. The very same mechanism may be rearranged in position so that turning the bottle on its longitudinal axis will provide the very same effect which is shown in Figs. 8, 9 and 10 of the drawing.

I claim:

A liquor measuring and dispensing device of the character described, comprising a housing having a liquor chamber formed therein, mounting means for mounting said housing in the neck of a bottle, a liquor flow tube in said mounting means providing communication between said liquor chamber and said bottle, a breather tube in said mounting means to serve as an air passage between said liquor chamber and said bottle, a pouring spout formed in said housing and communicating with said liquor chamber, an air vent formed in said housing and connecting with said liquor chamber, and a slide valve mounted in said housing for closing off the flow tube from the liquor chamber when it is in one position and for closing off the pouring spout from the liquor chamber when it is in another position, a trigger being connected to said slide valve for moving it manually from one of said positions to the other position, and a spring being connected to said slide valve for moving it from the other position to the first position when the trigger is released, said slide valve comprising a connecting tube provided in the liquor chamber and a plunger mounted within said connecting tube, one end connected to the pouring spout and the other end connected to the flow tube, openings formed in opposite ends of said connecting tube to provide communication between said connecting tube and the liquor chamber, said plunger being slidably mounted in said connecting tube for longitudinal movement into closing and opening positions relative to said openings in the connecting tube, said trigger being connected to said plunger for moving it in one direction and a spring acting against said trigger for moving the plunger in the opposite direction, whereby communication is provided between the flow tube and the liquor chamber when the plunger is in one position and whereby communication between the pouring spout and the liquor chamber is provided when the plunger is in another position, and a vent control valve operatively connected to the slide valve for controlling the air vent.

References Cited in the file of this patent

UNITED STATES PATENTS

| | | |
|---|---|---|
| 963,633 | Newland | July 5, 1910 |
| 2,209,766 | Dale et al. | July 30, 1940 |
| 2,455,962 | Wheeler et al. | Dec. 14, 1948 |
| 2,473,462 | Wortman | June 14, 1949 |
| 2,541,188 | Baldini et al. | Feb. 13, 1951 |
| 2,584,130 | Huebel et al. | Feb. 5, 1952 |
| 2,605,931 | Scannell et al. | Aug. 5, 1952 |

FOREIGN PATENTS

| | | |
|---|---|---|
| 18,699 | Great Britain | Sept. 1, 1898 |